Oct. 5, 1954  J. F. MORSE  2,690,919
PUSH-PULL CONTROL CABLE CONNECTION (CONE TYPE)
Filed March 11, 1950  2 Sheets-Sheet 1
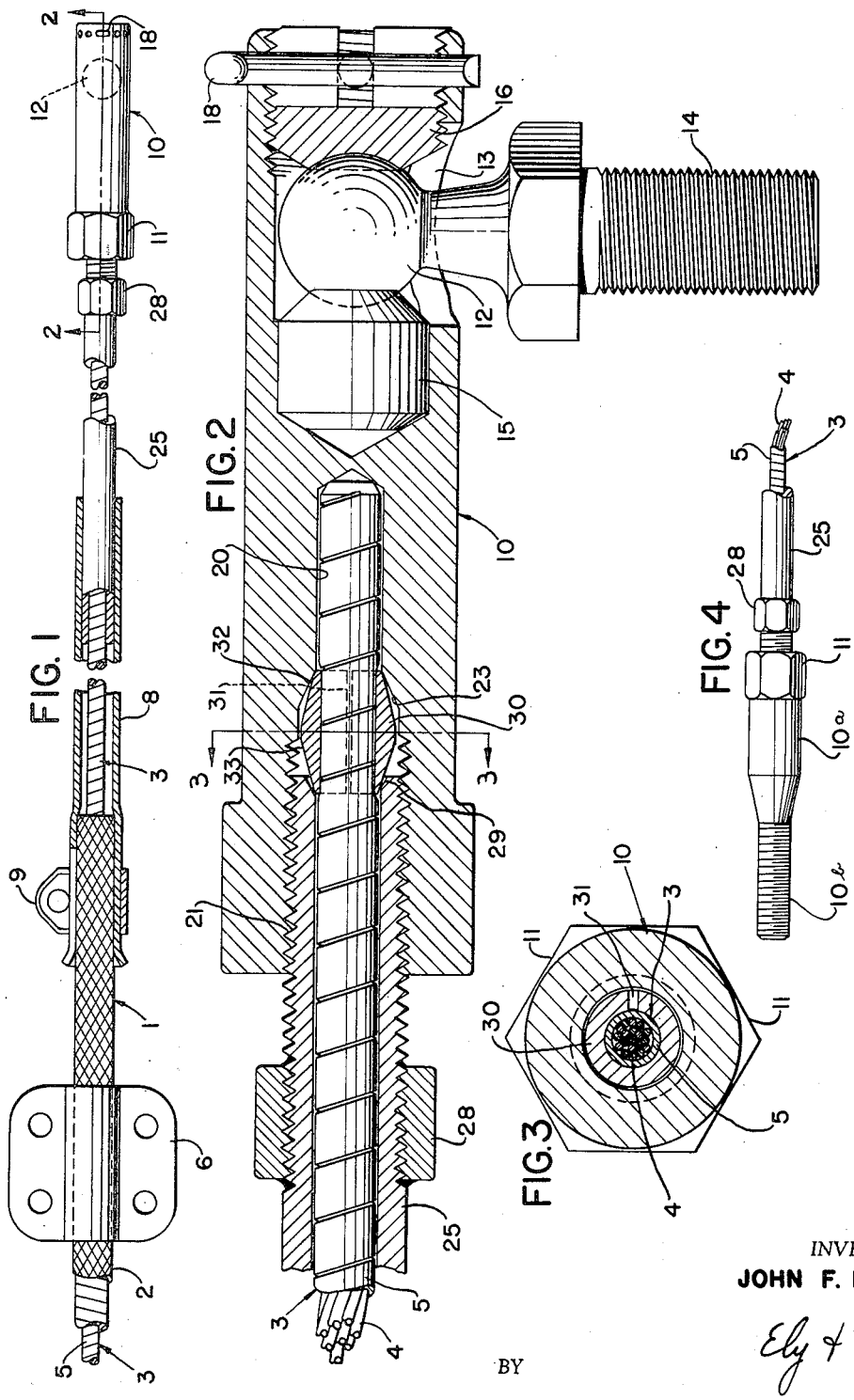
INVENTOR
JOHN F. MORSE
BY  Ely & Frye
ATTORNEYS Oct. 5, 1954          J. F. MORSE          2,690,919
PUSH-PULL CONTROL CABLE CONNECTION (CONE TYPE)
Filed March 11, 1950          2 Sheets-Sheet 2
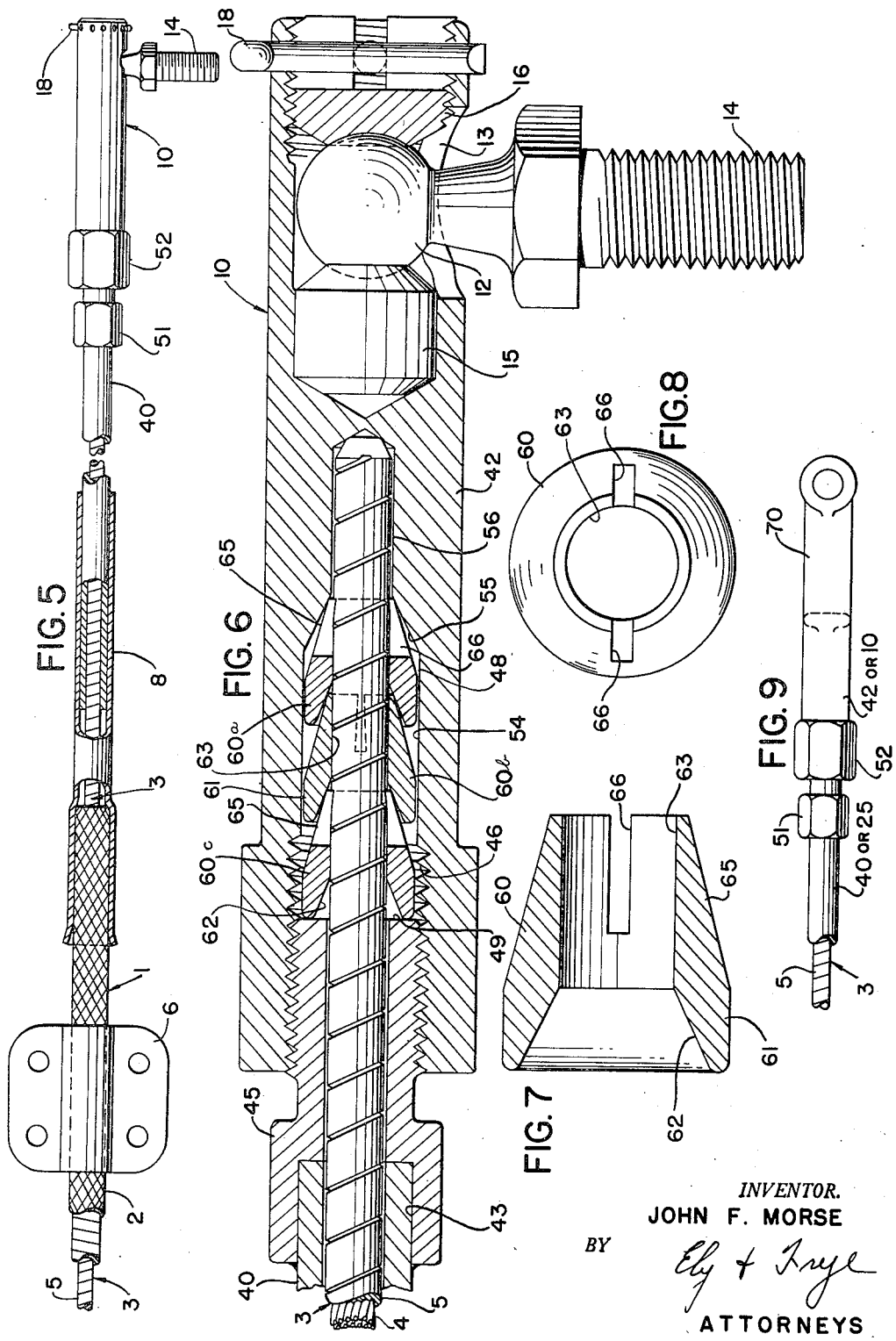
INVENTOR.
JOHN F. MORSE
BY
Ely & Frye
ATTORNEYS Patented Oct. 5, 1954

2,690,919

UNITED STATES PATENT OFFICE 2,690,919

PUSH-PULL CONTROL CABLE CONNECTION
(CONE TYPE)

John F. Morse, Hudson, Ohio

Application March 11, 1950, Serial No. 149,144

3 Claims. (Cl. 287—119)

The present invention relates to the provision of simple and effective means whereby any standard form of so-called "push-pull" cable may be provided with a means of attachment to an end fitting by which the core of the cable is operated. It is the purpose of the invention to provide a device of this character by which end fittings may be installed on location, with the use of simple hand tools, thereby avoiding the necessity of ordering the complete assembly from the factory or supply house and facilitating its installation. This enables the cable assembly to be cut, fabricated, and installed.

While the invention may be employed with any type of "push-pull" cable, it is shown as applied to a cable of the so-called "high efficiency" type. In this form of cable, the operating element or core is composed of a rope or cable made from a plurality of wires about which is compacted an outer covering made of a flat wire spirally applied to the innermost cable so that it holds the wires in a firm but flexible column. The fitting is attached to this core member, which is enclosed in an outer casing in which it will slide freely.

One of the advantages of the constructions shown herein is that while the core and the fitting are securely fastened and connected, the fitting may be easily disconnected so that, in case of injury to the cable, the parts can be readily separated for repairs or replacement of any part of the cable and subsequent reassembly.

Two forms of the invention are shown herein, it being understood that the invention is not limited to exact conformity with the details shown and described, but may be varied or modified within the scope of the claims. It will also be understood that either fitting may be used with other types of "push-pull" cables than those shown in detail herein.

The invention shown and described herein is in the nature of an improvement upon that shown in prior application of the same inventor, Serial No. 143,441, filed February 10, 1950.

In the drawings:

Fig. 1 is a side elevation of a cable assembly such as may be employed to carry out the purposes of the invention.

Fig. 2 is an enlarged longitudinal section through the fitting.

Fig. 3 is a cross-section on the line 3—3 of Fig. 2.

Fig. 4 shows a modified method of forming the end of the fitting for attachment to the operative means by which the core is moved or transmits the motion imparted thereto.

Fig. 5 is an assembly view of a modified form of the invention which differs from the form shown in Figs. 1 and 3 in that a multiplicity of clamping elements are used and also in the details of the guiding means employed for the fitting.

Fig. 6 is a longitudinal section through this form of the invention.

Fig. 7 is an enlarged section of one of the clamping collars removed from the assembly.

Fig. 8 is an end view of the part shown in Fig. 7.

Fig. 9 is a view showing a substitute form of connection between the fitting and the operative element.

Referring to the embodiment of the invention shown in Figs. 1 to 4, the cable assembly is indicated as a whole by the numeral 1. In the form shown, this comprises the usual outer casing 2, in which the core member slides. This casing usually has a water-proofed, braided cover applied over a spirally wound, flat wire, which provides the smooth inner surface through which the core may slide. In the form shown, the core, indicated as a whole by the numeral 3, consists of the inner member 4, formed from a plurality of wires twisted or bundled together and the cover member 5 composed of a flat wire ribbon, spirally wound and compacted about the inner member.

The cable assembly is fastened to the wall or other part of the structure by clamps, one of which is indicated at 6. At either end, the outer casing 1 is cut back, leaving a portion of the core 3 exposed beyond the end of the casing. Over the end of the casing is secured a guiding member 8, here shown as a tube, which extends over a portion of the exposed end of the core and is of a somewhat greater inner diameter than the outer diameter of the core. The end of the guiding member 8, which is received over the casing, is preferably flared and split so that it may be force-fitted over the end of the casing, a clamp 9 being used to draw the end of the guide into a tight fit over the casing.

The part 8 provides the means for guiding the fitting in its movement to and fro. The fitting is indicated as a whole by the numeral 10. In the form shown in Figs. 1 and 2, it is made from round bar stock and is formed with flattened surfaces 11 at its inner end so that it may be held by a wrench in assembling and disassembling the fitting.

At its outer end the fitting is provided with a recess 13 to receive the ball-head 12 of the operative element 14, this having any form of ball and socket connection with the fitting. That shown in detail in Fig. 2 consists of socket members 15 and 16, the former being located in the base of the recess and the latter being threaded into the outer end of the recess and provided with transverse slots through which the locking pin 18 may be passed.

In the alternative form shown in Fig. 4, the end of the fitting 10a is reduced and threaded, as shown at 10b, for attachment to the operative member.

The end of the fitting opposite to the operative attachment is axially drilled to provide a core-receiving socket or passage 20, which extends into the fitting for a substantial distance to receive the exposed end of the core 3. The outer portion of the socket 20 is counterbored for about half the depth of the socket and is internally threaded, as at 21. Between this larger area and the reduced inner end of the socket is located the tapering, cone-shaped, wedging surface 23.

Threaded into the part 21 is the rigid extension by which the fitting is guided by cooperation with the tube 8. In the form shown, this guiding extension is a sleeve 25, one end of which is threaded to be received in the socket 20 and the other end of which is smooth and is telescopically received in the end of the guide tube 8. The sleeve fits about the exposed end of the core. The sleeve is provided with a flattened area by which it may be rotated with respect to the fitting. This is shown as a nut 28, which is brazed or welded to the threaded portion of the sleeve. While other means may be provided for guiding the fitting in its movement, the telescoping sleeves 8 and 25 are preferred as they keep the core member from buckling.

The inner end of the sleeve 25 is tapered, as shown at 29, to provide a coned surface opposed to the surface 23, and between these two coned surfaces is located the clamping collar 30 shown in Figs. 2 and 3. This collar is of spring steel and is split, as shown at 31. Its outer surface is formed with the two cone-shaped, tapering surfaces 32 and 33, over which the coned surfaces 23 and 29 ride. As the sleeve 25 is threaded inwardly in the socket, the split collar is compacted so that it squeezes the outer covering 5 of the core and, when threaded home, the outer covering is compacted as shown in Fig. 2, firmly locking the fitting and the cable together. The compression of the outer covering causes the sharp edges of the covering to bite into the sharp edges of the collar and this affords a positive grip on the core member.

In assembling the fitting on the cable, the length of cable for the job is first cut from a supply and then the casing is cut back at either end to expose the requisite length of the core. The guide tube 8 is then clamped to the end of the casing, the sleeve 25 is placed over the core and entered into the end of the tube, the split collar is threaded over the end of the core, and then the fitting is placed over the core and started at the threaded connection. Holding the sleeve and the fitting by the surfaces 11 and 28, one of these elements is rotated, driving the sleeve into the socket and the collar against the coned surfaces, which contracts the collar about the exposed core, with the result indicated in Fig. 2.

In disassembly, the sleeve 25 is removed from the fitting and, if the collar does not spring out of engagement with the core, a blunt tool, such as a screw driver, may be used to spread the collar.

In the form of the invention shown in Figs. 5 to 8, inclusive, the cable, core, and guide tube are the same as in the earlier form and bear the same reference numerals. Likewise, the ball and socket connection with the operative member 14 is the same as in Figs. 1 and 2.

The rigid guiding extension bears the numeral 40 and fits and slides in the tubular guide 8 in the same manner as in the earlier forms. The connection with the fitting 42 is somewhat different from the earlier form as the outer end of the extension 40 terminates short of the fitting and is force-fitted and welded or brazed in a socket 43 in the outer end of a thimble or coupling 45, the inner end of which is threaded into the threaded end of the outer, counterbored portion 46 of the axial bore 48 formed in the fitting 42. The inner end of the coupling is flat to form a thrust surface, indicated at 49. The coupling or thimble 45 and the fitting are provided with the flat or hexagon formations 51 and 52, respectively, by which the parts may be rotated with respect to one another.

Inwardly of the threaded portion 46 of the socket is an unthreaded portion 54, which terminates in a coned, tapered surface 55 leading to the reduced, innermost portion 56 of the socket which receives the outer end of the core 3. This surface 55 constitutes an abutment for the clamping collar and is preferably tapered as shown, although tapering is not essential since the taper on the collar may be sufficient.

Located between the inner end of the thimble 45 and the conical surface 55 is the clamping and locking means. In this form of the invention, this locking means comprises a gang of locking collars which are shown in Fig. 6 and one of which is shown in detail in Figs. 7 and 8. In the drawings, three of these clamping collars, indicated as a whole by the numeral 60, are shown, nested together, one receiving the thrust from the sleeve or thimble and another bearing against the coned surface 55.

Each of three clamping collars is formed as a ring with its larger end solid, as shown at 61, and provided with an internal, coned recess or socket 62 leading to a central passage or bore 63, which fits around the core 3. The nose of each collar is externally tapered or coned as shown at 65 and is split, preferably at diametrically opposed points as shown at 66, for a sufficient distance to enable the sharp leading edge portion of the collar to contract and dig into the outer surface of the core.

When threaded upon the core 3, the tapered surface on the right hand collar 60a bears against the abutment surface 55, while the tapered surface on the nose of the middle collar 60b enters the socket 62 in collar 60a and the nose of 60c into the collar 60b. While only one of these collars may be used, it is preferred to use a plurality of them so as to afford a number of points at which the collars engage and grip the core 3, as the thimble or sleeve 45 is threaded home, contracting and driving the sharp nose of each collar and causing the sharp edges of the collars to dig into the outer cover 5 of the core, firmly interlocking the core and the fitting.

The steps of assembling this form of connection correspond to those described in relation with the earlier form. In disassembling the connection between the core and the fitting, the threaded sleeve 45 is backed out of its socket and the cable and end fitting are shifted to expose the collars, after which the collars may be pried loose from the core by a blunt tool engaging the slots 66.

In Fig. 9, a clevis connection 70 is shown as a substitute for the ball and socket or threaded connection between the fitting and the operative elements shown in the other views.

It will be seen that in either embodiment of the invention there is provided a simple and effective locking means by which a fitting may be readily but firmly mounted on the end of the core of a "push-pull" cable assembly. The parts are also capable of easy disassembly for maintenance, repair, or replacement of any part of the cable which may require servicing. It will be noted that in all forms of the invention the area of contact between the tapered surface of the split tapered portion of the collar or clamp is located in a narrow band or line close to the extremity of the collar. This is true whether the compression upon the collar is exerted by the tapered surfaces on the fitting and the threaded sleeve, as in the form shown in Fig. 2, or whether the compression is exerted by the tapered surface on the fitting and the flaring tapered surfaces 62 on the several collars 60 in Fig. 6. The effect of this construction is that the sharp edges of the collars are crimped inwardly into the surface of the core, with the result that the sharp edges of the ribbon 5 actually dig into the collars and the sharp edges of the collars dig into the outer covering. This gives a much firmer gripping action between the fitting and the core than is possible by a mere overall contraction of a split collar about the core.

While it is preferred that the clamping collars in both forms of the invention have conical surfaces and that the abutments in the sockets have a correspondingly tapered surface, it is obvious that any equivalent means to contract the collar and shrink it about the core may be employed.

What is claimed is:

1. A fitting for a cable, said fitting having a socket receiving the end of the cable, and a reduced abutment surface inwardly thereof, a plurality of clamping collars located over the cable, each of said collars having a split tapering portion at one end thereof, and a conical recess on the other end thereof, said collars being assembled with the tapering portion of one collar in contact with the said abutment surface and the tapering portion of the adjacent collar in contact with the conical recess, and means to force the collars together and cause the tapered ends of all the collars to shrink onto the surface of the cable.

2. A fitting for the exposed end of the core of a push-pull cable, said fitting having a socket receiving the end of the core, an abutment surface inwardly thereof, a gang of contractible collars located over the core, in contact with one another, each of said collars having a tapered end portion and a tapered recess, said collars being nested together with the tapered end portion of one collar in the tapered recess of an adjacent collar, the end portions of the collars being split, and means to drive the gang of collars against the abutment surface and to contract the split portions of the collars about the core.

3. A fitting for a cable, said fitting having a socket receiving the end of the cable, an abutment inwardly of the socket, at least two similarly formed collars surrounding the cable and located in the socket, each collar having a solid end and a split tapered end with a sharpened inner edge on the said tapered end, a recess on the solid end of each collar to receive the tapered end of another collar, the innermost collar having a line bearing at its tapered end with the abutment, the other collar having a line bearing at its tapered end with the recess in the adjacent collar, and means to compact the several collars against each other and against the abutment.

References Cited in the file of this patent

UNITED STATES PATENTS

| Number | Name | Date |
|---|---|---|
| 1,248,448 | Brown | Dec. 4, 1917 |
| 1,369,301 | Rarig | Feb. 22, 1921 |
| 1,712,108 | Goeller | May 7, 1929 |
| 1,964,237 | Wheeler | June 26, 1934 |
| 2,041,385 | Van Laanen | May 19, 1936 |
| 2,147,239 | Buchanan | Feb. 14, 1939 |
| 2,309,596 | Johnson | Jan. 26, 1943 |
| 2,325,671 | Gerry | Aug. 3, 1943 |
| 2,438,380 | Arens | Mar. 23, 1948 |
| 2,517,705 | Paquin | Aug. 8, 1950 |

FOREIGN PATENTS

| Number | Country | Date |
|---|---|---|
| 250,453 | Switzerland | Aug. 2, 1948 |
| 352,268 | Germany | Apr. 24, 1922 |
| 354,171 | Great Britain | Aug. 4, 1931 |
| 380,035 | Great Britain | Sept. 8, 1932 |
| 579,145 | Great Britain | July 24, 1946 |
| 627,055 | France | May 28, 1927 |
| 676,202 | Germany | June 22, 1939 |
| 784,420 | France | Apr. 29, 1935 |